April 7, 1970 J. BUHR 3,505,605

AUTOMATIC MOTOR SHUT-OFF NETWORKS FOR SIGNAL SEEKING RECEIVERS

Filed Dec. 19, 1966

INVENTOR.
JACOB BUHR

BY [signature]

PATENT AGENT

United States Patent Office 3,505,605
Patented Apr. 7, 1970

3,505,605

AUTOMATIC MOTOR SHUT-OFF NETWORKS FOR SIGNAL SEEKING RECEIVERS

Jacob Buhr, Kitchener, Ontario, Canada, assignor to Electrohome Limited, Kitchener, Ontario, Canada Filed Dec. 19, 1966, Ser. No. 602,944
Int. Cl. H04b *1/32*
U.S. Cl. 325—470 8 Claims

ABSTRACT OF THE DISCLOSURE

A signal seeking receiver has an automatic motor shut-off network that includes first and second transistors interconnected in flip-flop configuration such that when either is turned on or off, the other is kept turned off or on respectively. Signals are applied to the first transistor to turn it on when the signals are above a predetermined level, and the first transistor is biased on when the motor is operating. The second transistor is connected in a circuit through which current required in order for the motor to operate must pass. Means are provided for changing the state of conduction of one of the transistors to turn on the second transistor and initiate motor operation.

Figures 1, 2:
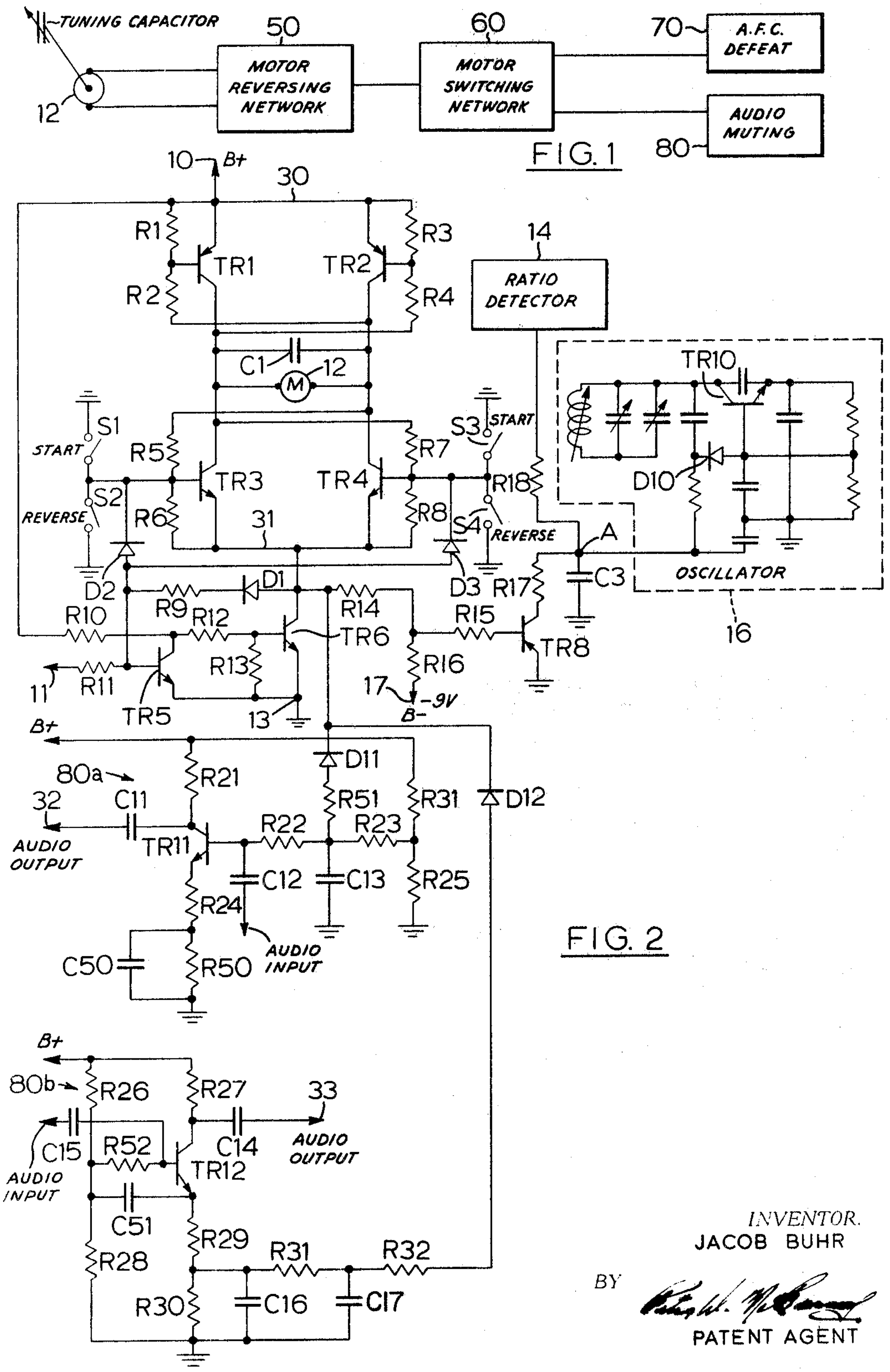

This invention relates to radio receivers of the signal seeking type. More particularly, this invention relates to networks for automatically turning off the motor of a signal seeking receiver when the receiver is tuned to the frequency of a signal being received by the receiver and of a strength greater than a minimum predetermined signal strength. This invention also relates to automatic shut-off networks for driving automatic A.F.C. defeat and automatic audio muting networks, the latter two types of networks being described and claimed in co-pending patent applications Ser. No. 602,939, filed Dec. 19, 1966, Ser. No. 602,943, filed Dec. 19, 1966, and Ser. No. 602,942, filed Dec. 19, 1966.

In any signal seeking receiver it is necessary to provide some means for turning on the motor that drives the tuning condenser when the receiver is turned on but no signal is being received, or when it is desired to change stations. These means must be capable of automatically shutting off the motor when the receiver is tuned in on a signal of a level greater than a minimum predetermined level. In accordance with this invention, there is provided a relatively simple and inexpensive transistor circuit for accomplishing the foregoing objectives.

When the motor of a signal seeking receiver is operating, so that signal seeking is taking place, it is desirable for the A.F.C. circuit of the receiver to be defeated automatically, i.e., rendered inoperative, since this permits closer tuning to be obtained than would be possible if the A.F.C. were not defeated. A.F.C. defeat networks for signal seeking receivers that can be driven from automatic shut-off networks embodying this invention are disclosed herein.

During signal seeking it also is desirable that the audio output of the receiver be muted automatically, so that noise will not be heard as the tuning condenser is moved between one station and the next. Automatic muting networks for signal seeking radio receivers that can be driven from automatic shut-off networks embodying this invention are disclosed herein.

A signal seeking receiver embodying this invention is of a type that has variable tuning means for varying the tuning of the receiver and a motor drivingly connected to the tuning means, whereby the tuning of the receiver can be changed by operation of the motor. In accordance with this invention, such a signal seeking receiver is provided with an automatic shut-off network for automatically turning off the motor when the receiver is tuned to the frequency of a signal being received by the receiver and of a strength greater than a minimum predetermined strength. The automatic shut-off network includes first and second transistors interconnected in bistable configuration such that when one of the transistors is turned on, the other of the transistors is kept turned off until the state of conduction of the one transistor changes, and vice versa. Means are provided for supplying a signal to the base electrode of the first transistor when the receiver is tuned to the frequency of a signal being received by the receiver to turn on the first transistor when this signal is of a strength greater than a minimum predetermined strength. The second transistor is connected in a circuit through which current required in order for the motor to operate must pass, whereby, when the second transistor is turned off, this current is unable to flow through the circuit and the motor ceases operating. Means are provided for supplying a biasing voltage to the first transistor to turn the first transistor on when the motor is not operating. Means also are provided for changing the state of conduction of one of the transistors to turn on the second transistor and initiate operation of the motor.

This invention will become more apparent from the following detailed description, taken in conjunction with the appended drawings, in which FIGURES 1 and 2 are block and circuit diagrams respectively illustrating a signal seeking receiver embodying this invention.

Referring to FIGURE 1, there is illustrated in block form certain components of a signal seeking receiver. These components consist of a motor reversing network 50, a motor switching network 60, an A.F.C. defeat network 70, an audio muting network 80 and a motor 12. Motor 12 is drivingly connected to the tuning capacitor of the receiver, whereby, upon operation of the motor, the tuning of the receiver may be varied.

Motor reversing network 50 is shown in greater detail in FIGURE 2, to which reference now is made. The motor reversing network which is illustrated in FIGURE 2 is exemplary only, and those skilled in the art will realize that many different types of motor reversing networks could be used in the practise of this invention. In fact, a motor reversing network is not essential to this invention. In this respect, after the tuning condenser of the receiver has been fully rotated in one direction by motor 12, it could be returned manually to its original position. Motor reversing network 50 includes four transistors; TR1, TR2, TR3, TR4. A source of positive D.C. potential, i.e., a D.C. power supply (B+), is connected to a terminal 10 which, in turn, is connected to a conductor 30. The emitter electrodes of transistors TR1 and TR2 each are connected to conductor 30. Resistors R1 and R3 are connected between conductor 30 and the base electrodes of transistors TR1 and TR2 respectively. A resistor R2 is connected between the base electrode of transistor TR1 and the collector electrode of transistor TR2, while a resistor R4 is connected between the base electrode of transistor TR2 and the collector electrode of transistor TR1. A capacitor C1 is connected between the collector electrodes of transistors TR1 and TR2. Motor 12 also is connected between the collector electrodes of transistors TR1 and TR2. It is assumed that motor 12 is of a type having a permanent magnet field, in which event the armature of motor 12 will be connected as shown in FIGURE 2. However, if motor 12 should have an electromagnetic field, the field coils could be connected between the collector electrodes of transistors TR1 and TR2 with the armature of the motor then being supplied from some other source. Regardless of which arrangement is employed, a reversal in the direction of the current passing through motor 12 will cause a corresponding reversal in the direction of rotation of the motor. The collector electrodes of transistors TR1 and TR3 are connected together, as are the collector electrodes of the transistors TR2 and TR4. The emitter electrodes of transistors TR3 and TR4 are connected by a conductor 31. Resistors R6 and R8 are connected between the base and emitter electrodes of transistors TR3 and TR4 respectively. A resistor R5 is connected between the collector electrode of transistor TR4 and the base electrode of transistor TR3, while a resistor R7 is connected between the collector electrode of transistor TR3 and the base electrode of transistor TR4. The motor reversing network also includes start switches S1 and S3 and reverse switches S2 and S4. Switches S1 and S2 are connected in parallel with each other between the base electrode of transistor TR3 and a terminal at a reference potential, namely ground potential. Switches S3 and S4 also are connected in parallel with each other but between the base electrode of transistor TR4 and ground.

Motor switching or automatic shut-off network 60 includes two transistors TR5 and TR6, these transistors being so connected that when one is turned on, the other is kept turned off, and vice versa until the state of conduction of the former transistor changes. The collector electrode of transistor TR6 is connected via a diode D1 and a resistor R9 to the base electrode of transistor TR5. The collector electrode of transistor TR5 is connected to the base electrode of transistor TR6 by means of a resistor R12. A resistor R13 is connected in voltage divider relationship with resistor R12, resistor R13 being connected between the base electrode of transistor TR6 and a terminal at a reference potential namely ground potential. The emitter electrodes of transistors TR5 and TR6 both are grounded.

As will become more apparent hereinafter, the collector and emitter electrodes of transistor TR6 are connected in a circuit through which the current (armature or field current) required to operate motor 12 must pass. Consequently, motor 12 only can operate if transistor TR6 is turned on. It is to be understood, however, that it is not essential to this invention that either the field or armature current of motor 12 pass through transistor TR6 when this transistor is turned on. All that is required is that a current required for the motor to operate pass through transistor TR6 when it is turned on. For example, this current may flow through the coil of a relay having its contacts in the field or armature circuit of motor 12.

A resistor R10 is connected between B+ and the collector electrode of transistor TR5.

Diodes D2 and D3 are connected between the base electrode of transistor TR5 and the base electrodes of transistor TR3 and TR4 respectively.

A terminal 11 is connected to the base electrode of transistor TR5 by a resistor R11. Terminal 11 may be connected to the ratio detector 14 of the receiver or to some other component of the receiver which provides a D.C. signal when the receiver is tuned to the frequency of a signal being received by the receiver.

A conventional A.F.C. network consisting of ratio detector 14, which provides an A.F.C. signal, a resistor R18, a filter capacitor C3 and an oscillator 16 including a transistor TR10 and a frequency determining component in the form of a variable capacitance diode D10 is shown in FIGURE 2. Resistor R18 and capacitor C3 are connected in series circuit between the centre point of ratio detector 14 and a terminal at a reference potential, namely ground potential. Point A, i.e., the common terminal of resistor R18 and capacitor C3 is connected to diode D10. More specifically, diode D10 is connected in a circuit that shunts capacitor C3.

A.F.C. defeat network 70 includes a transistor TR8 that is of opposite conductivity type to the conductivity type of transistor TR6. The emitter electrode of transistor TR8 is grounded. A resistor R17 and the collector and emitter electrodes of transistor TR8 are connected in a circuit across capacitor C3. A terminal 17 is connected to a negative D.C. power supply (B−), and the potential at terminal 17 may be −9 volts, for example. Biasing voltage for transistor TR8 to turn this transistor on is supplied from B− to the base electrode of transistor TR8 via resistors R16 and R15, the latter resistors being connected in series circuit with each other between terminal 17 and the base electrode of transistor TR8.

Connected between the collector electrode of transistor TR6 and the common terminal of resistors R15 and R16 is a resistor R14 which provides a path whereby an overriding bias voltage is supplied to the base electrode of transistor TR8 to turn this transistor off when transistor TR6 is turned off and motor 12 is not operating.

Two different embodiments of audio muting network 80 are shown in FIGURE 2, one being designated **80*a* and the other being designated 80*b*. Both audio muting networks are connected to the collector electrode of transistor TR6, audio muting network 80*a* being so connected via a diode D11, and a resistor R51 and audio muting network 80*b*** being so connected via a diode D12.

Audio muting network **80*a* employs an audio amplifying stage including a transistor TR11 whose base electrode is coupled via a capacitor C12 to a preceding audio amplifier of the receiver or to the detector of the receiver. An audio output signal is derived at an audio output terminal 32** coupled to the collector electrode of transistor TR11 via a capacitor C11. A collector resistor R21 is connected between B+ (18–20 volts, for example) and the collector electrode of transistor TR11. Emitter resistors R24 and R50, the latter being bypassed by a capacitor C50, are connected between the emitter electrode of transistor TR11 and ground. Two bias resistors R31 and R25 are connected in series with each other between B+ and ground. The common terminal of these two resistors is connected via a bias resistor R23 and a bias resistor R22 to the base electrode of transistor TR11. The anode of diode D11 is connected to the common terminal of resistors R22 and R23, while a capacitor C13 is connected between this common terminal and ground. Capacitor C13 prevents the bias voltage applied to the base electrode of transistor TR11 from rising too rapidly when diode D11 becomes reversed biased as a result of transistor TR6 turning off.

Audio muting network **80*b* employs an audio amplifying stage including a transistor TR12 whose collector electrode is connected to B+ (18–20 volts, for example) via a collector resistor R27. Bias for the transistor is obtained via resistors R26 and R28 connected between B+ and ground, their common terminal being connected to the base electrode of transistor TR12 via a bootstrapping resistor R52. Audio input signals are coupled to the base electrode of transistor TR12 from a preceding audio stage or the detector of the receiver by means of a coupling capacitor C15. A coupling capacitor C14 is connected between the audio output terminal 33** and the collector electrode of transistor TR12. The emitter electrode of transistor TR12 is connected via emitter resistors R29 and R30 to ground. Resistor R30 is bypassed by a bypass capacitor C16. Connected between the anode of diode D12 and the common terminal of resistors R29 and R30 is a series circuit consisting of resistors R31 and R32. Resistors R31 and R32 permit changes in the bias conditions for transistor TR12 to be achieved, and they also assist in plop suppression. A capacitor C17 is connected between ground and the common terminal of resistors R31 and R32 and serves to keep sudden changes in bias from reaching an objectionable level. A bootstrapping capacitor C51 is connected between the emitter electrode of transistor TR12 and the common terminal of resistors R26 and R28.

The operation of the circuit hereinbefore described now will be discussed.

With switches S1–S4 open, when a positive D.C. potential, B+, which may be 10–12 volts, for example, is applied to terminal 10, transistor TR5 will be biased on, regardless of whether or not there is an input signal present at input terminal 11. With transistor TR5 turned on, transistor TR6 will be kept off, and, as will become more apparent hereinafter, since transistor TR6 must be turned on before motor 12 can start, motor 12 will not operate.

Two paths are provided for the current required to turn on transistor TR5. One path is from terminal 10 via resistors R1, R2, R5 and R6, diode D1 and resistor R9 to the base electrode of transistor TR5. The other path is from terminal 10 via resistors R3, R4, R7 and R8, diode D1 and resistor R9 to the base electrode of transistor TR5. Diode D1 provides a low impedance path for the turn on current which ensures that transistor TR5 will turn on before transistor TR6 when B+ is applied to terminal 10. It will be appreciated that if transistor TR5 were not turned on before transistor TR6, transistor TR6 would be turned on due to current flowing from terminal 10 to terminal 13 via resistors R10, R12 and R13. This would result in transistor TR5 losing its control function.

Diode D1 presents a high impedance to any positive D.C. signal applied to input terminal 11, by virtue of which excessive loading of this signal is eliminated.

In order to start motor 12, it is necessary to close momentarily either start switch S1 or S3. Assume that start switch S1 is closed momentarily. When switch S1 is closed, diode D2 will establish a low impedance path between the base electrode of transistor TR5 and ground, and the relatively high voltage which, prior to the closing of switch S1, had been applied to the base electrode of transistor TR5 and which kept this transistor turned on, immediately will decrease to the relatively small voltage drop across diode D2. Transistor TR5 then will turn off, with the result that the voltage at its collector electrode will rise. The relatively high voltage at the collector electrode of transistor TR5 will be applied to the base electrode of transistor TR6 via the voltage divider network consisting of resistors R12 and R13, and, whereas when transistor TR5 was turned on and its collector voltage was relatively low, thereby holding transistor TR6 off, now transistor TR6 will turn on because of the increase in the voltage which will be applied to its base electrode when transistor TR5 is turned off. The voltage at the collector electrode of transistor TR6 will drop as soon as this transistor turns on, and this relatively low voltage will be applied to the base electrode of transistor TR5 via diode D1 and resistor R9, thereby keeping transistor TR5 turned off. The voltage at the collector electrode of transistor TR6 when it is turned on is dependent on the saturation voltage of the transistor and typically may be of the order of +0.2 to +0.3 volt. The same sequence of events as outlined hereinbefore would result from the closing of switch S3.

It will be seen from the foregoing that transistors TR5 and TR6 are interconnected in such a manner that when one is on the other is kept off and vice versa until the state of conduction of the former transistor changes, i.e., in bistable configuration.

The closing of switch S1 short circuits, i.e., grounds the base electrode of transistor TR3, so that transistor TR3 can not conduct and its emitter-collector junction will present a high impedance. However, sufficient current will flow from terminal 10 to terminal 13 through the circuit consisting of resistors R3, R4, R7 and R8 and transistor TR6 to turn on transistor TR4. When transistor TR4 is turned on, its emitter-collector junction will present a low impedance, and current then can flow from terminal 10 to terminal 13 via the circuit consisting of resistors R1 and R2 and transistors TR4 and TR6. Transistor TR1 will then turn on. The low voltage drop across transistor TR1 (emitter-collector drop) when transistor TR1 conducts will keep transistor TR2 turned off. Similarly the low voltage drop across the collector-emitter junction of transistor TR4 will keep transistor TR3 turned off. Thus, transistors TR2 and TR3 will be turned off, while transistors TR1 and TR4 will be turned on even after switch S1 is re-opened. Under these conditions, current will flow from terminal 10 to terminal 13 via the circuit consisting of transistor TR1, motor 12, transistor TR4 and transistor TR6, by virtue of which motor 12 will run in one direction and change the setting of the tuning capacitor of the radio receiver. Capacitor C1 has the effect of preventing transistors TR1 and TR2 from oscillating.

Motor 12 will continue to run until a station is tuned in. When a station is tuned in, an input signal in the form of a D.C. voltage will appear at input terminal 11, this signal being derived from the ratio detector, for example, of the receiver, and will turn on transistor TR5, provided that the signal at terminal 11 is above a minimum predetermined signal strength. Transistor TR6 will then turn off, and since motor current must flow through the collector-emitter path of transistor TR6, motor 12 will turn off.

It will be appreciated that if switch S3 had been closed momentarily rather than switch S1, this would initiate a sequence of events leading to the turn on of transistors TR2 and TR3, which, in turn, would keep transistors TR1 and TR4 turned off, and which would result in rotation of motor 12 in a direction opposite to the direction of rotation resulting from the closing of switch S1.

Reversing switches S2 and S4 will be closed momentarily when the tuning gang reaches the limit of its travel in either direction, and the closing of these switches will result in an automatic change in the direction of rotation of motor 12.

A more detailed description of the operation of the network consisting of motor 12 and transistors TR1–TR4 and their associated components will be found in copending Canadian patent application Ser. No. 953,605, filed Mar. 2, 1966, Networks for Controlling the Direction of Rotation of a Direct Current Motor, Jacob Buhr (corresponding to United States patent application Ser. No. 531,518, filed Mar. 3, 1966), the disclosure of which is incorporated herein by reference. Other types of motor reversing networks which may be used in the practice of this invention also are disclosed therein.

From the foregoing it will be seen that a network consisting of transistors TR5 and TR6 and their associated components and switches S1–S4 is provided to control the operation of motor 12. This network is so designed that one of the switches must be closed to initiate motor operation, and operation of the motor will be stopped automatically when the receiver tunes in on a station.

The operation of the A.F.C. defeat network now will be discussed. As aforementioned, while motor 12 is running and a signal is being sought, it is desirable to render the A.F.C. circuit of the receiver inoperative, since this permits closer tuning to be obtained than if the A.F.C. remained operative. Of course, as soon as a station is tuned in, the A.F.C. circuit must be made operative again to avoid drift.

One terminal of resistor R18 is connected to the center point of ratio detector 14. Consequently, when a station is tuned in exactly, the voltage at this terminal of resistor R18 will be zero, but if the receiver is tuned to above or below the exact frequency of the station, a positive or negative voltage respectively will be developed at this terminal. The signal applied to resistor R18 need not necessarily be derived from a ratio detector, although this probably is the most convenient source for the A.F.C. signal. All that is required is that resistor R18 be supplied with a D.C. signal that indicates both the degree and direction of mistuning.

When transistor TR6 is on and motor 12 running, the voltage at the collector electrode of transistor TR6 will be relatively low, say of the order of +0.2 to +0.3 volt. Consequently the negative supply voltage, −9 volts, connected to terminal 17 will turn on transistor TR8. Under these circumstances, the impedance presented by transistor TR8 to negative voltages at the junction of resistor R18 and capacitor C3 will be low, and capacitor C3 will be essentially short circuited, i.e., the voltage at point A will be essentially ground potential so the A.F.C. signal will be substantially short circuited. Similarly, the impedance presented by transistor TR8 to positive voltages at point A also will be low, although not as low as it would be for negative voltages. However, by appropriate selection of resistor R18, which may be 220KΩ, as compared to 10KΩ for resistor R17, capacitor C3 will be essentially short circuited for positive voltages at point A, and the voltage at point A will be essentially ground potential. Thus, as long as motor 12 is running, the potential at point A will remain substantially the same, i.e., substantially ground potential. Since the base electrode of transistor TR10 is held at a fixed voltage, and since the voltage at point A also is essentially fixed during running of motor 12, the voltage across variable capacitance diode D10 will remain substantially constant, and A.F.C. will be effectively defeated.

When transistor TR6 is turned off, i.e., when a station is tuned in, motor 12 will stop running, as aforementioned, and the voltage at the collector electrode of transistor TR6 will rise, to say +10 volts or more. In any event, there will be a sufficient increase in voltage to override the negative supply voltage at terminal 17 and turn off transistor TR8. Transistor TR8 then will present a high impedance to positive and negative voltages at point A, and normal A.F.C. will resume with variations in the potential at point A causing changes in the capacitance of diode D10, which will result in changes in the frequency of oscillations of oscillator 16 in a direction to compensate for the frequency deviation that caused the correction.

The D.C. impedance of the circuit consisting of resistor R17 and the collector and emitter electrodes of transistor TR8 should be low (relative to the impedance of resistor R18) when transistor TR8 is turned on and high when transistor TR8 is turned off.

It is to be understood that it is not essential that transistor TR8 be biased off from transistor TR6 when motor 12 is not operating, although this is definitely preferred. In general, transistor TR8 could be connected to any transistor that is on when motor 12 is running and off when the receiver is tuned to the frequency of a signal being received by the receiver and of a strength greater than a minimum predetermined signal strength, provided that when this transistor is off, it will keep transistor TR8 turned off.

When transistor TR6 is conducting and motor 12 is running, so that signal seeking is taking place, it is very desirable that the audio output of the receiver be muted.

The operation of network 80*a* to achieve the desired muting now will be described. When transistor TR6 is on and motor 12 is running, the voltage at the collector electrode of transistor TR6 will be relatively low. The voltage drop across the collector-emitter junction of transistor TR6 and diode D11 will be lower than $V_{BE}$ of transistor TR11, so that transistor TR11 will be held off and will not amplify the audio input signal applied to its base electrode via capacitor C12. Consequently there will be no audio output signal. When transistor TR6 is turned off in response to a signal being selected, and motor 12 stops running, the voltage across the collector-emitter junction of transistor TR6 will rise, diode D11 will become reverse biased, and network 80*a* will resume normal operation as an audio amplifier amplifying the audio signals applied to its base electrode.

As will be seen from the foregoing, when transistor TR6 is turned off, a bias voltage will be supplied to transistor TR11 to forward bias the base-emitter junction of transistor TR11, but when transistor TR6 is turned on, a low impedance path will be provided, and the aforementioned bias will be reduced below that required to maintain the forward bias on the base-emitter junction of transistor TR11.

It is to be understood that it is not essential that transistor TR11 be connected to transistor TR6, although this is definitely preferred. In general, transistor TR11 could be connected to any transistor that is on when motor 12 is running and off when the receiver is tuned to the frequency of a signal being received by the receiver and of a strength greater than a minimum predetermined signal strength, provided that this transistor is connected in a circuit having a sufficiently low impedance when the transistor is on to reduce the base-emitter junction bias voltage supplied to transistor TR11 to a value below that required to forward bias this junction.

Muting is achieved with network 80*b* by saturation of transistor TR12 when transistor TR6 is on. When transistor TR6 is on and motor 12 is running, resistors R31 and R32 in series will shunt resistor R30. This will result in a lowering of the effective resistance in the emitter circuit of transistor TR12, but there will be no change in the base electrode voltage of this transistor, since this is determined by B+ and the size of resistors R26 and R28. Since the emitter voltage of transistor TR12 will remain at the base voltage thereof less the $V_{BE}$ of the transistor, there will be an increase in the current through transistor TR12 to maintain the required voltage drop in the emitter circuit of transistor TR12. Transistor TR12 then will be saturated, and the audio output therefrom will be effectively muted, since the voltage swings that it can amplify will be very low.

When transistor TR6 is turned off and motor 12 stops running, the relatively high collector voltage of this transistor will reverse bias diode D12, resistors R31 and R32 no longer will shunt resistor R30, and normal operation of network 80*b* as an audio amplifying stage will resume.

As will be seen from the foregoing, when transistor TR6 is turned off, the D.C. impedance of the path shunting resistor R30 will be very high, since the turn off of transistor TR6 will substantially open circuit this path. In any event, the D.C. path impedance will be much higher than the resistance of resistor R30, so that the resistance in the emitter circuit of transistor TR12 will be substantially the sum of hte resistances of R29 and R30. On the other hand, when transistor TR6 is turned on, the resistance in the emitter circuit of transistor TR12 will be considerably less than the sum of the resistances of resistors R29 and R30.

It is to be understood that it is not essential that transistor TR12 be connected to transistor TR6, although this is definitely preferred. In general, transistor TR12 could be connected to any transistor that is on when motor 12 is running and off when the receiver is tuned to the frequency of a signal being received by the receiver and of a strength greater than a minimum predetermined signal strength, provided that this transistor is connected in a circuit that reduces the effective resistance in the emitter circuit of transistor TR12 sufficiently to saturate transistor TR12 when the former transistor is turned on, this circuit presenting a high resistance when the transistor is turned off.

While preferred embodiments of this invention have been disclosed herein, those skilled in the art will appreciate that changes and modifications may be made therein without departing from the spirit and scope of this invention as defined in the appended claims.

I claim:

1. In a signal seeking receiver of a type having variable tuning means for varying the tuning of said receiver and a motor drivingly connected to said tuning means, whereby the tuning of said receiver can be changed by operation of said motor;

(a) an automatic shut-off network for automatically turning off said motor when said receiver is tuned to the frequency of a signal being received by said receiver and of a strength greater than a minimum predetermined signal strength, said automatic shut-off network comprising first and second transistors interconnected in bistable configuration, such that when either of said transistors is turned on or off, the other of said transistors is kept turned off or on respectively by the first mentioned transistor until the state of conduction of said first mentioned transistor changes;

(b) means for supplying a first signal to said first transistor when said receiver is tuned to the frequency of a signal being received by said receiver to turn on said first transistor when said first signal is of a strength greater than a minimum predetermined signal strength;

(c) means connecting said second transistor in a circuit through which current required in order for said motor to operate must pass, whereby when said second transistor is turned off, said current is unable to flow through said circuit and said motor ceases operating;

(d) means for supplying a biasing voltage to said first transistor to turn on said first transistor when said motor is not operating; and (e) means for changing the state of conduction of one of said transistors to turn on said second transistor and initiate operation of said motor.

2. The invention according to claim 1 wherein said means for changing the state of conduction of one of said transistors, includes switching means having first and second different states and which initiate operation of said motor when in said second state and means responsive to said switching means being in said second state thereof providing a path for reducing said biasing voltage supplied to said first transistor below that required to keep said first transistor turned on, whereby said first transistor is turned off when said switching means is in said second state thereof.

3. The invention according to claim 2 wherein said signal seeking receiver is of a type including a motor reversing network for reversing the direction of rotation of said motor, said motor reversing network including said switching means.

4. The invention according to claim 2 wherein said transistors each have base, collector and emitter electrodes and including a first resistor connected between said collector electrode of said first transistor and said base electrode of said second transistor, a second resistor connected in voltage divider relationship with said first resistor and connected between said base electrode of said second transistor and a terminal at a reference potential, means connecting said emitter electrodes of said transistors and said terminal, and a first diode and a third resistor connected in series circuit with each other between said collector electrode of said second transistor and said base electrode of said first transistor.

5. The invention according to claim 2 wherein said transistor each have base, collector and emitter electrodes and wherein said means providing said path include a second diode connected between said base electrode of said first transistor and said switching means.

6. The invention according to claim 4 wherein said means for supplying a biasing voltage to said first transistor comprise a D.C. power supply, said first diode and said third resistor, said D.C. power supply also being connected to said collector electrode of said second transistor and to said collector electrode of said first transistor.

7. The invention according to claim 6 wherein said means providing said path include a second diode connected between said base electrode of said first transistor and said switching means.

8. The invention according to claim 4 wherein said means providing said path include a second diode connected between said base electrode of said first transistor and said switching means, said second diode also being connected in a series circuit with said first diode and said third resistor between said collector electrode of said second transistor and said switching means, said means for supplying a biasing voltage to said first transistor comprising a D.C. power supply, said first diode and said third resistor, said D.C. power supply also being connected to said collector electrode of said second transistor and to said collector electrode of said first transistor.

References Cited

UNITED STATES PATENTS 3,334,187 8/1967 Pampel ---------- 325—471 XR
3,131,370 4/1964 Hahnel ---------- 325—471 XR

OTHER REFERENCES

Ryder, Electronic Fundamentals and Applications (Third Edition), 1964, p. 550, Figures 16–34.

KATHLEEN H. CLAFFY, Primary Examiner

B. P. SMITH, Assistant Examiner